United States Patent
Li

(10) Patent No.: US 7,983,301 B2
(45) Date of Patent: Jul. 19, 2011

(54) METHOD FOR EXTENDED TRANSMISSION CAPABILITIES OF SHORT MESSAGE SERVICE

(75) Inventor: Cheng Li, Chengdu (CN)

(73) Assignee: O2Micro International, Ltd., Georgetown (KY)

( * ) Notice: Subject to any disclaimer, the term of this patent is extended or adjusted under 35 U.S.C. 154(b) by 1387 days.

(21) Appl. No.: 11/165,860

(22) Filed: Jun. 24, 2005

(65) Prior Publication Data

US 2006/0291505 A1   Dec. 28, 2006

(51) Int. Cl.
*H04J 3/00* (2006.01)

(52) U.S. Cl. ......... 370/473; 370/474; 370/335; 370/342

(58) Field of Classification Search .......... 370/370–474, 370/335, 342, 358, 479, 341, 329
See application file for complete search history.

(56) References Cited

U.S. PATENT DOCUMENTS

| | | | | |
|---|---|---|---|---|
| 5,414,796 A * | 5/1995 | Jacobs et al. | | 704/221 |
| 5,990,810 A * | 11/1999 | Williams | | 341/51 |
| 6,418,147 B1 * | 7/2002 | Wiedeman | | 370/468 |
| 6,473,793 B1 * | 10/2002 | Dillon et al. | | 709/223 |
| 7,009,999 B2 * | 3/2006 | Dickson | | 370/468 |
| 7,536,418 B2 * | 5/2009 | Buchsbaum et al. | | 707/200 |
| 2001/0048709 A1 * | 12/2001 | Hoffmann et al. | | 375/130 |
| 2004/0037292 A1 * | 2/2004 | Gulati et al. | | 370/395.5 |
| 2004/0045030 A1 * | 3/2004 | Reynolds et al. | | 725/110 |
| 2004/0213291 A1 * | 10/2004 | Beshai et al. | | 370/473 |
| 2005/0147057 A1 * | 7/2005 | LaDue | | 370/310 |
| 2006/0078064 A1 | 4/2006 | Schmidt | | |
| 2006/0133421 A1 * | 6/2006 | Homer et al. | | 370/474 |

FOREIGN PATENT DOCUMENTS

| | | |
|---|---|---|
| EP | 0989704 A2 | 3/2000 |
| JP | 2000-04968 A | 2/2000 |
| JP | 2003-196268 A | 7/2003 |
| JP | 2005-33659 A | 2/2005 |
| JP | 2005-530381 A | 10/2005 |
| WO | 03/0988894 A1 | 11/2003 |

OTHER PUBLICATIONS

Translation of Office Action received in JP application No. 2006-172894, dated Jun. 29, 2010.

* cited by examiner

*Primary Examiner* — Huy D Vu
*Assistant Examiner* — Dady Chery
(74) *Attorney, Agent, or Firm* — Wang Law Firm, Inc.; Li K. Wang

(57) ABSTRACT

A method to enhance a mobile device's ability to transmit short messages over a wireless communication network is provided. The method includes the steps for preprocessing a data according to it data type, fragmenting the data into a plurality of data segments if the data is larger than a predetermined size after being preprocessed and compressed, and transmitting the data segments from a sending terminal after encoding the data segments. The method also includes the steps of recombining the plurality of decoded data segments into a single data after receiving and decoding the data, and displaying the data as a single piece of data at a receiving terminal after decompressing and processing the data.

5 Claims, 3 Drawing Sheets

C – COMPRESSION FLAG (1 BIT).
0=NOT COMPRESSED, 1=COMPRESSED.

S – SERIAL NUMBER (7 BITS).
FROM 1 TO N. N IS THE TOTAL SMS NUMBER.

D – DATA BODY. THE REAL DATA.

P – PARITY CHECK (1 BYTE).

METHOD FOR EXTENDED TRANSMISSION CAPABILITIES OF SHORT MESSAGE SERVICE

FIELD OF THE INVENTION

The present invention relates to wireless communications and in particular to Short Message Service (SMS) for wireless communication systems.

BACKGROUND OF THE INVENTION

Short Message Service (SMS) is commonly used in Global System of Mobile (GSM), Global Position System (GPS), assisted-GPS (AGPS), General Packet Radio Service (GPRS), Code Division Multiple Access (CDMA) and other wireless communication systems. Because of its convenience and low price, SMS has become one of important information exchange techniques for mobile devices nowadays and likely continue to be further utilized in the near future in various communication fields.

In the GPRS and CDMA systems, data can be exchanged not only between a mobile phone and a base station, but also between two mobile phones. The mobile phones usually take advantage of SMS as an effective way to transmit short text data between the users. However, in the prior art SMS specifications, only text messages can be exchanged and the size of text messages is very limited. For example, one SMS message can only have 140 bytes of data.

In the GSM system, the SMS specification (GSM SMS specification 03.42 Version 7.1.1) describes a SMS compression standard for transmitting compressed text messages, so the SMS capabilities can be extended. However, this SMS compression standard is seldom used so far because of the low compression rate, and higher cost to design application circuits for data exchange. This SMS compression standard also produces many compatibility problems with some wireless communication systems during the data exchange process.

In addition, some cell phone manufacturers have created some proprietary functions for transmitting ring tones or pictures between cell phones and almost all of the cell phone manufacturers have their own ways to extend the SMS capacity. For example, Nokia, Motorola and Sony have different SMS transmission formats. However, these extensions often are not compatible with each other. Generally, Nokia device users can send special ring tones or pictures between them without any impediment. However, a Nokia device user cannot successfully send a self-programmed ring tone or picture to a Sony device user or Motorola device user. Moreover, some cell phone producers often impose certain strict format and size limitation for messages, such as rings and pictures. For example, only special ring tones in the MIDI format and blank-white point-pictures can be sent between Nokia cell phones.

The disadvantages of low compression rates, proprietary formats and size limitations greatly restrict the SMS applications. It is thus desirous to have a method that extends SMS capabilities so that different sizes of data can be transmitted as short messages between cell phones from different makers thus enabling exchange of different types of data, and it is to such a method the present invention is primarily directed.

BRIEF SUMMARY OF THE INVENTION

In one embodiment, the invention is a method to enhance a mobile device's ability to transmit data as short messages over a wireless communication network, wherein each data is identified by a type. The method includes the steps for determining the type of the data, preprocessing the data according to the type of the data, compressing the preprocessed data according to a predefined algorithm, fragmenting the compressed data into a plurality of data segments if the compressed data is larger than a predetermined size, encoding the data segments, and sending the plurality of data segments over the wireless communication network. Each data segment is smaller than the predetermined size.

In yet another embodiment, the invention is a method to enhance a mobile device's ability to transmit data as short messages over a wireless communication network, wherein each data is identified by a type. The method includes the steps for receiving a plurality of data segments from the wireless communication network, decoding the plurality of data segments, recombining the plurality of decoded data segments into a single data, determining the type for the single data, decompressing the single data into a decompressed data according to a predefined algorithm based on the type of the received data, processing the decompressed data upon the type of the received data, and displaying the processed data as a single piece of data.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

The invention provides a method to extend Short Message Service (SMS) capabilities to overcome a plurality of limitations in traditional mobile communications. Usually, a message that is smaller than a predetermined size can be transmitted as a short message, for example, a message smaller than 140 bytes can be freely transmitted as a short message between cell phones from different makers. This technology has been widely adopted by various cell phone makers and communication service providers. However, use of the SMS features has not expanded greatly because the SMS features cannot support massages that exceed a predetermined size, for example, a message that includes pictures or ring tones cannot be transmitted between two cell phones from different makers when the message has a size larger than the predetermined size. The present invention enables difference sizes of data to be transmitted as short messages, thus permitting large non-textual data to be exchanged between cell phones from different makers. For clarity, the operations involving a message of a size larger than a predetermined value are described below in more details.

Figure 1:
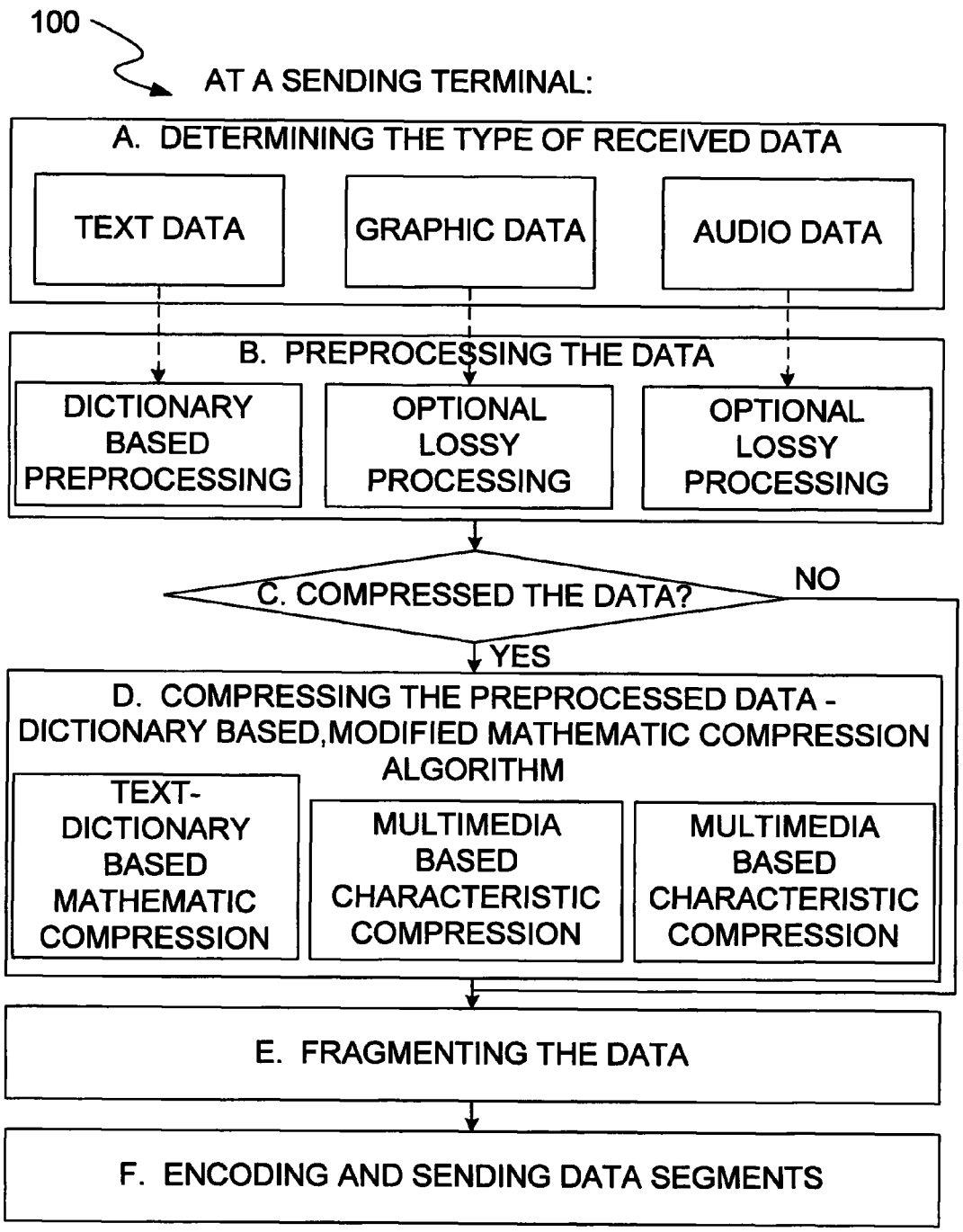
FIG. 1 is a block diagram of operations at a sending terminal in accordance with one embodiment of the invention.

FIG. 1 illustrates a block diagram 100 of operations at a sending terminal. The operations at the sending terminal includes the steps of (A) determining the type of received data, (B) preprocessing the data, (C) determining whether to compress the data, (D) compressing the preprocessed data if the data need to be compressed, (E) fragmenting the data, and (F) encoding and sending the fragmented data.

In step (A), the data type is determined after the data are received. The data may include three types of data, text data, graphic data and audio data. The data will be processed based on their type as described below. There are different ways to identify the type of the received data. One way is that a user of a cell phone, which acts as a sending terminal, specifies the data type before sending the data. Another way is that the cell phone identifies the data type by a data file's extension. Those skilled in the art will appreciate other ways to determine a data type.

In step (B), the data are preprocessed after their types are determined and different types of preprocessing can be selected and performed according to the data type. If the data are text data, they will undergo a dictionary based preprocessing. In this preprocessing, a custom and user definable dictionary with at least several thousand words can be provided to reduce the data, i.e., a dictionary with several thousand words can significantly reduce the size of the text data. For instance, "^h" in the dictionary can designate the phrase "go home". When the expression "go home" is being sent inside a message between cell phones, a sending cell phone translates "go home" into "^h" and only "^h" is actually transmitted to a receiving cell phone, which then translates "^h" back into "go home" before displaying the received message to a user. Thus, the expression "go home" has been transmitted using fewer bytes. Moreover, the dictionary can include most of commonly used phrases, so that long sentences can be replaced by much shorter representations during the transmission process. The principle described herein can be utilized with any language supported by the cell phones.

If the data are graphic data, for example, pictures or electronic maps, the data can be preprocessed with lossy processing. For example, the pictures can be decolorized through the lossy processing so the size of the graphic data can be reduced. For instance, when a picture of 65,535 colors is sent from one cell phone to another cell phone with a display screen that supports only 24 colors, the picture can reduce its color from 65,535 colors to 24 colors prior to the transmission. The decolorized principle can be widely used in any kind of graphic data, such as pictures, electronic maps and camera snaps. Furthermore, during the preprocessing procedure, the graphic data can be sampled in an interleaved format, instead of in a line-by-line format, thus reducing its data size. By taking advantage of the interleaved sampling, a sending terminal needs to transmit only half of the graphic data and the graphic data are reduced to about 50% in size. The lossy processing can be implemented in various ways depending on the requirements of the display screen at a receiving terminal. Another example of the lossy processing is reduction of graphic data when the graphic data is sent to a receiving device that has a smaller display screen or a screen with a lower display resolution. The graphics data that have been preprocessed with the lossy processing can still be adequately displayed at the receiving terminal.

If the data are audio data, for example, ring tones, the audio data can also be preprocessed through the lossy processing like the graphic data. The size of the audio data can be reduced by taking advantage of the lossy processing. The lossy processing can also be implemented through sampling the audio data based on a proprietary frequency. Similar to the processing of graphic data, the lossy processing of the audio data need to be implemented according to the limitations of the audio device.

Additionally, in the preprocessing step, format data included in the data can be striped off to reduce the data size. In the SMS messages, many data have certain format data, such as the header of the data and the footer of the data. The format data can be stripped off and replaced by predefined flags. The flags, which are shorter than the format data, are then transmitted from the sending terminal. At the receiving terminal, the flags can be replaced by the original format data. For example, "====this is beginning====" is a header of the data before the data body. Before being transmitted from the sending terminal, the header of "====this is beginning====" is stripped off from the data and a shorter flag is configured to replace the header. After the above processing, only the flag and the data body are transmitted to the receiving terminal. Those skilled in the art will appreciate that other format data defined by the users or the cell phone makers can also be stripped from the data so as to reduce the size of the data.

In step (C), the data are determined whether to be compressed. If the data need to be compressed, the data are then compressed in step (D). Different types of compressions can be performed according to the data type. If the data need not to be compressed, the data are directly to be fragmented in Step (E) when the data is larger than a predetermined size as said above. Compared with the compressed data, the uncompressed data are transmitted to the receiving terminal in steps similar to those for compressed data except step (D).

In step (D), the preprocessed data can be compressed for further reducing the size of the received data. The reduction of the data can facilitate the data transmission as a short message over the wireless communication network. The compression usually can be implemented by utilizing various compression algorithms known to those skilled in the art. The compression algorithms can be further optimized and modified according to different characteristics of the cell phones. For example, the compressed algorithm can be designed and optimized based on Lemple-Ziv-Markov chain—Algorithm (LZMA) such that a high compression rate can be obtained for the preprocessed data.

Furthermore, in one embodiment, the text data can be processed according to a text-dictionary based mathematic compression to obtain a desirable compression ratio. The graphic data can be processed according to a multimedia based characteristic compression to obtain a desirable compression rate. Similar to the graphic data, the audio data can also be processed according to a multimedia based characteristic compression.

Although the size of the received data can be reduced after being preprocessed and compressed, some data may still exceed the SMS's capacity. In this situation, the compressed data can be fragmented into several data segments. In Step (E), if the compressed data are greater than a predetermined limit, currently 140 bytes for the SMS, the data greater than 140 bytes are fragmented into several data segments whose lengths are smaller than the predetermined limit. The format of a fragmented data segment is depicted in FIG. 2.

After being processed by the above steps, all data segments have a smaller size and they can easily be transmitted through the SMS communication. In step (F), some information, such as the number of the cell phone at the sending terminal and the number of the cell phone at a receiving terminal, are encoded based upon wireless system specifications. The data segments are attached next to the encoded information. The encoded information and the data segment can be synchronously sent as short messages from a sending terminal to a receiving terminal over the wireless communication network.

Figure 2:
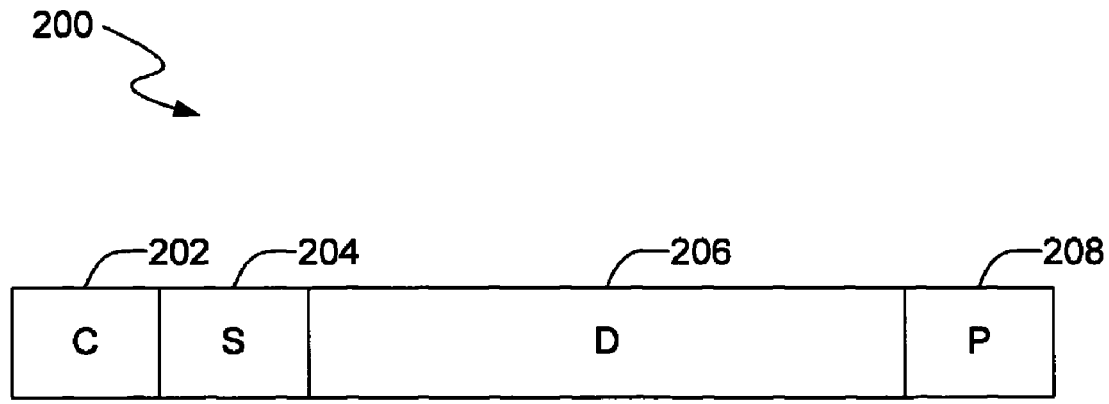
FIG. 2 is an exemplary format for a short message.

FIG. 2 illustrates an exemplary format 200 of a SMS data fragment. The first bit 202 is a compress flag that indicates whether the data are compressed. If the compress flag is set to "0," the data are not compressed; if the flag is set to "1," the data are compressed. The second field 204 next to the first bit represents the serial number of a data segment. For example, if the data are divided into N data segments and if the serial number is 2, then the second data segment is being transmitted through the SMS communication. In one embodiment, the second field 204 has seven bits. However, those skilled in the art will appreciate that the size in the format taken by the serial number can vary based on the total number of the data segments.

The data body is stored in the third field 206 after the serial number field 204. The data body contains the data segment that is being transmitted. The last field 208 of the format is for integrity check and the last field 208 is one byte. The check field 208 is optional, and a plurality of check methods, such as parity check, can be used to check the integrity and veracity of a short message. If the parity check is utilized in the format, the parity check bit in each short message transmission is used to check the data segment.

Those skilled in the art will appreciate that some modifications can be made to the format of the SMS data segment. In one embodiment, the first bit 202 is a compression flag that indicates whether the data are compressed. The second field 204 next to the first bit is a sequence flag of the transmitted data segment. The sequence flag can consist of a flag for the first data segment in each data segment group, a group flag, and a serial number flag of each data segment. If the flag for the data segment is set to "1," the data segment is the first data segment in the data group. Otherwise, if the flag for the data segment is set to "0," other data segment, except the first data segment, is being transmitted.

For instance, an expression "11000001 00001000" is illustrated for the compression flag and the sequence flag. The first "1" indicates the data segment being transmitted has been compressed. The second "1" indicates the data segment is the first data segment of the data group. The third and the forth bits are reserved in the format. The following bits "0001" denote that the data segment is one of the data segments in the first group. The next bits "00001000" indicate the serial number of the data segment is "eight" and the eight data segment in the first group is being transmitted from the sending terminal. After the data segment has been transmitted, other seven data segments in the first data group can be transmitted from the sending terminal one by one in a decreasing order based on the serial number. The next field of the format, field 206 is designed to indicate the data body of the data segment. The check part may be implemented by attaching one check bit to the compressed data. By this way, the check bit can only be transmitted once, thus saving the transmission capacity by avoid transmitting the check bit repeatedly.

Furthermore, those skilled in the art will appreciate that the size of each field in the format is not fixed and it can be enlarged or shortened according to the specific requirements of the data segments. Those skilled in the art will also appreciate that a plurality of other check methods can be used to check the integrity of a short message, such check methods including CRC (Cyclic Redundancy Check).

Figure 3:
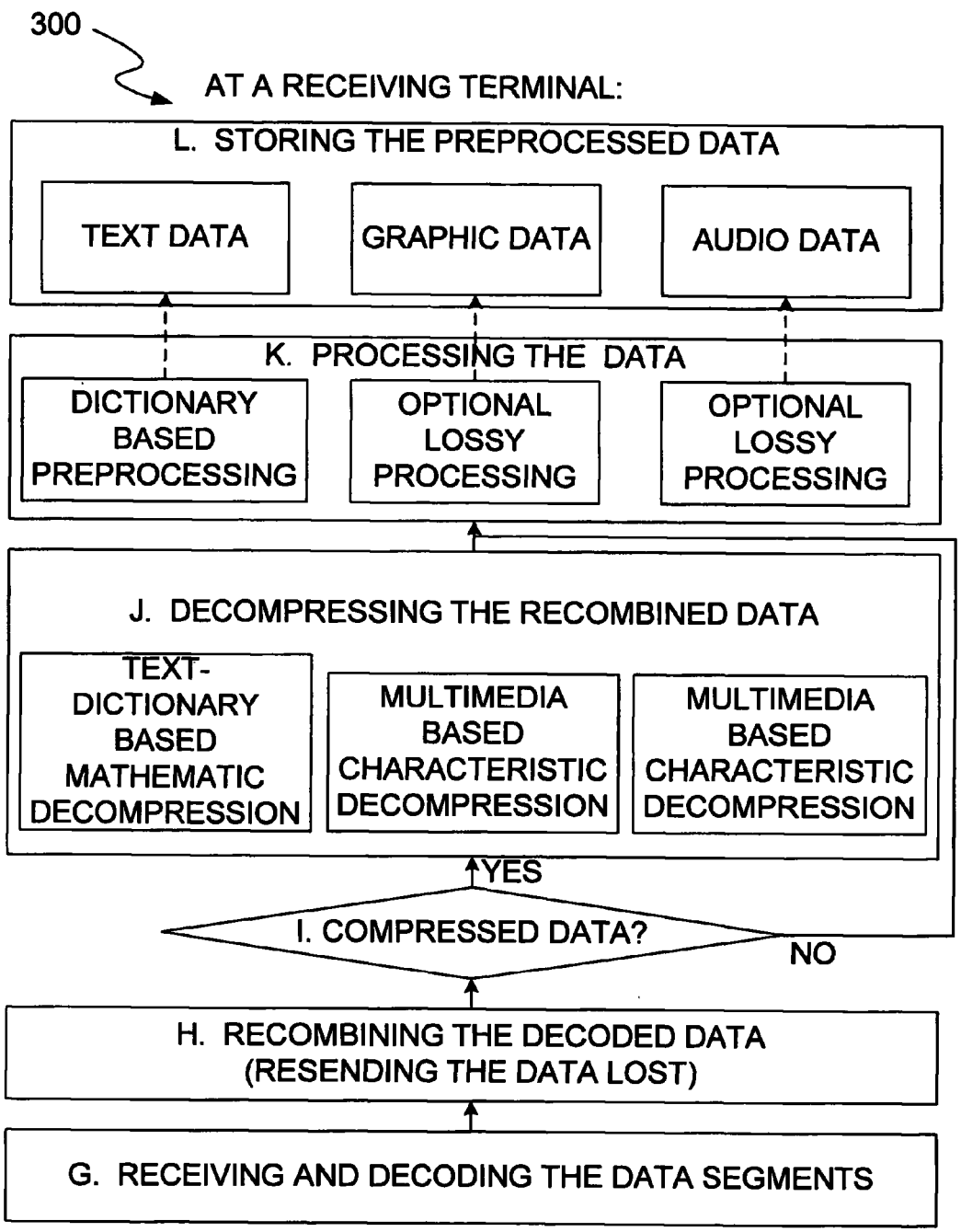
FIG. 3 is a block diagram of operations at a receiving terminal in accordance with another embodiment of the invention.

FIG. 3 illustrates a block diagram 300 of an operation for processing SMS data at a receiving terminal. The operation at the receiving terminal includes the steps of (G) receiving and decoding the data segments, (H) recombining the decoded data, (I) determining if the data are compressed, (J) decompressing the recombined data if needed, (K) processing the decompressed data, and (L) storing the processed data.

In step (G), the data segments received from the sending terminal are decoded at the receiving terminal. The received data can be further processed in two different ways. One way is the cell phone users manually choose a software to process the data after the data are received. The alternative is for the operating system (OS) of the receiving terminal automatically activating the software to handle the data after receiving the data.

After being decoded, the data segments are checked whether there are any errors produced during in the wireless transmission in step (H). If there are no errors in the data segments, the data segments are recombined into on single data in step (H). If a data segment contains errors, a request is sent for the sending terminal to resend the data segment. If a data segment is lost during the transmission, a request will be sent for the sending terminal to resend the lost data segment. When there are no errors in the data segments, the data segments will be recombined into single data according to their serial numbers.

In step (I), the data are also checked whether they are compressed data or not. If the data segments have a compress flag "1", then the recombined data have been compressed in Step (D). The compressed data will be decompressed in Step (J). If the data segments have a compress flag "0", then the recombined data are uncompressed data. The uncompressed data will directly be processed in Step (K).

After being recombined, the compressed data are decompressed in Step (J). The decompression can be implemented as a reverse process of Step (D). Opposite to Step (D), the text data can be processed through a text-dictionary based mathematic decompression, and the graphic data and the audio data can be processed through a multimedia based characteristic decompression.

In Step (K), the decompressed data or the uncompressed data can be processed. Similar to Step (B), the data are processed through a dictionary based preprocessing and/or an optional lossy processing. In addition, if the format data have been stripped off in Step (B), the format data will be restored into the data the in Step (K).

In Step (L), the processed data can be stored as the text data, the graphic data, and the audio data. The stored data can then be processed by an appropriate device, such as a display screen or an audio device, at the receiving terminal.

It should be recognized by those skilled in the art that the data format of the SMS communication described in FIG. 2 is not exclusive. It should be recognized by those skilled in the art that other data formats can also be used for the SMS communication and implemented without departing from the spirit of the invention. It should also be further recognized by those skilled in the art that some steps in FIG. 1 and FIG. 3 can be omitted for certain type of data. Finally, it should also be further recognized by those skilled in the art that the invention to enhance transmission capabilities of short message service can be utilized in other mobile devices besides the cell phones.

For further understanding of the invention, an example of a user sending an image to his friend is described herein. In operation, the user can use a camera enabled cell phone to capture an image that he wants to send to his friend using a different cell phone. Because the image is a graphic data, usually of a larger size, the image is pre-processed through a lossy processing in step (B) to reduce its data size. During the lossy processing, the format data of the data in the image can be eliminated and replaced by a flag. Assuming that the friend's cell phone is capable of displaying only images with 24 colors and the user's cell phone camera is capable of capturing images with 1024 colors, the captured image is decolorized from its original colors to 24 colors before the transmission. The image may also be reduced in size if the friend's cell phone has a smaller display screen or a lower resolution screen. The image can also be sampled in an interleaved format, instead of in a line-by-line format. The interleaved sampling can reduce about 50% of the size of the image.

After being preprocessed, the preprocessed image is compressed based on a multimedia based characteristic compression algorithm. Other compression algorithms can also be used to compress the image. If the compressed image is still larger than a predetermined size, the compressed image can be fragmented into several smaller data segments. Each of the data segments has a size smaller than the predetermined size. For instance, if the predetermined limit is 140 bytes and the compressed image has 1000 bytes, the image is fragmented into eight data segments. After being encoded, the data segments are sent from his cell phone to his friend's cell phone.

After receiving the data segments, the friend's cell phone decodes the data segments. If some errors have occurred during the wireless transmission or some data in the data segments are lost, a request is send back to a base station serving the cell phones so the lost data segments can be resent. If there are no errors in the decoded data segments, the data segments are recombined into a single data. In this instance, the eight data segments are orderly received and decoded the friend's cell phone. If there are no errors in the eight data segments, the eight data segments are recombined into a single data. Because the data have been compressed as described above, the recombined data is decompressed based upon a multimedia based characteristic decompression algorithm.

After being decompressed, the data of the image is restored by a process that is a reverse of the process employed before the data being transmitted. However, because the pre-processing at the transmitting end was through a lossy process, the received data cannot be fully restored to its original condition. Meanwhile, the format data are restored and incorporated into the processed data. Finally, the restored image can be displayed on a display screen on the friend's cell phone.

The embodiments that have been described herein are some of the several possible embodiments which utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A method to enhance a mobile device's ability to transmit data as sho11 message over a wireless communication network, the data having a type, comprising the steps for:
   determining the type of the data;
   preprocessing the data according to the type of the data;
   compressing the preprocessed data according to a predefined algorithm;
   fragmenting the compressed data into a plurality of data segments if the compressed data is larger than a predetermined size, whereto each data segment is smaller than the predetermined size;
   encoding tile data segments; and
   sending tile plurality of data segments along with a serial number of each data segment over the wireless communication network,
   wherein the preprocessing step further comprising the steps for:
   stripping off format data from the data to reduce the size of the data; performing a dictionary based preprocessing if the data are text data; performing a loss), processing if the data are graphic data; performing a lossy processing if the data are audio data; and
   sampling the audio data based on a proprietary frequency if the data are audio data;
   performing a text-dictionary based mathematic compression if the data are text data; performing a multimedia based characteristic compression if the data are graphic data; and performing a multimedia based characteristic compression if the data are audio data.

2. The method of claim 1, wherein the preprocessing step further comprising the step for decolorizing the data to reduce the size of the data if the data are graphic data.

3. The method of claim 1, whereto the file step for sampling the audio data being ill an interleaved format if the data are graphic data.

4. Tile method of claim 1, wherein the preprocessing step further comprising the step for resizing the data if the data are graphic data.

5. The method of claim 1, wherein sending step further comprising the step for transmitting each data segment as a short message over the wireless communication network.

* * * * *